Dec. 8, 1936. R. W. SMITH 2,063,201
METHOD OF UTILIZING WASTE CARBON DIOXIDE GAS
Filed Oct. 27, 1934
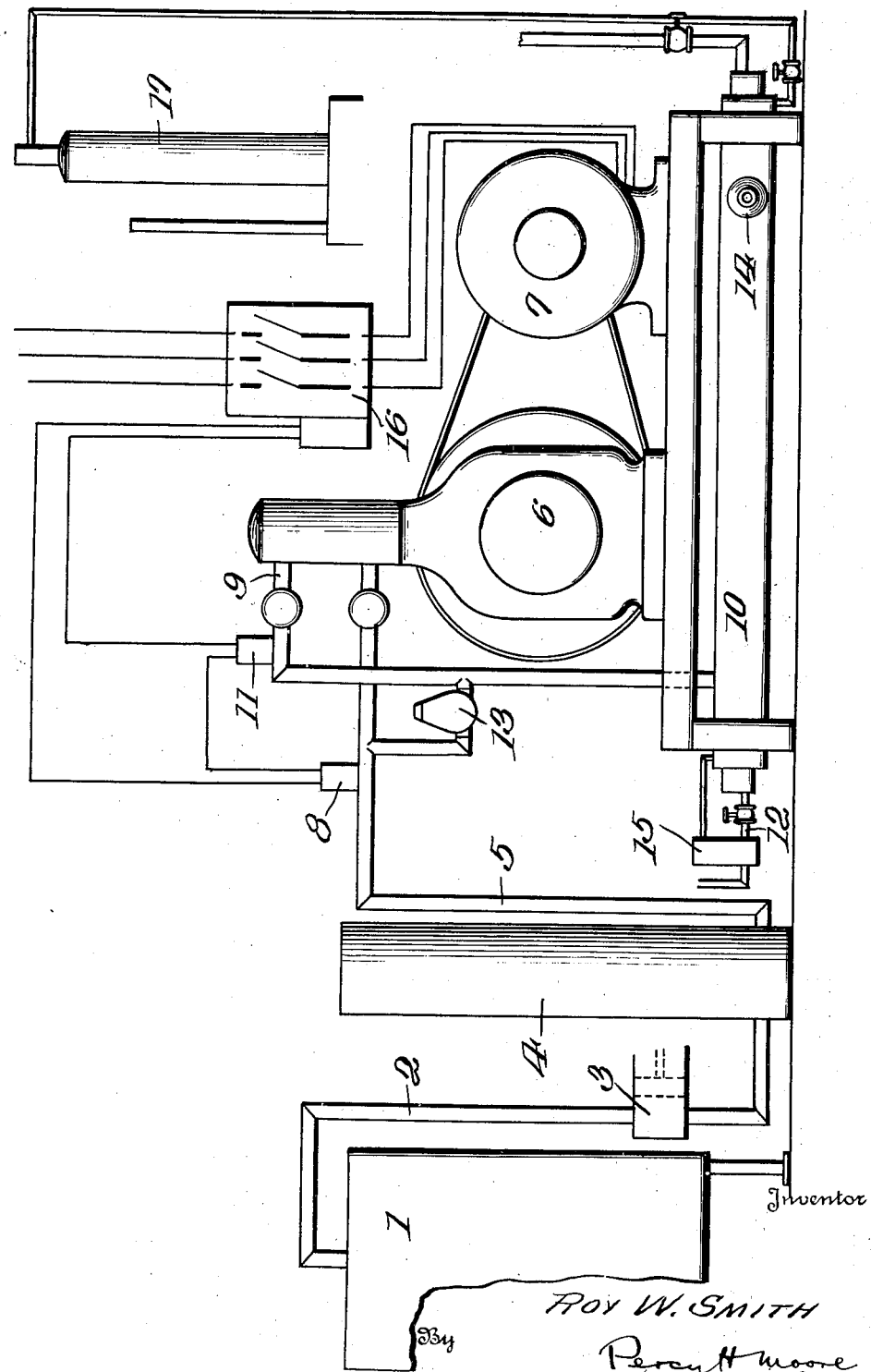
Inventor
ROY W. SMITH
By Percy H Moore
Attorney Patented Dec. 8, 1936

2,063,201

UNITED STATES PATENT OFFICE 2,063,201

METHOD OF UTILIZING WASTE CARBON DIOXIDE GAS

Roy W. Smith, Newark, Ohio

Application October 27, 1934, Serial No. 750,391

5 Claims. (Cl. 62—122)

This invention relates to the utilization of carbon dioxide gas, arising from the fermenting vats of breweries and distilleries, for carbonizing or charging beverages.

Heretofore it has been the practice to allow the excess carbon dioxide gas collected in the fermenting vats to waste, and to purchase liquefied carbon dioxide gas from other sources such as coke ovens, for the convenience of the breweries' customers. This carbon dioxide gas is unsatisfactory in that it is expensive and has an unpleasant sharpness.

The principal object of my invention is to provide an efficient method and apparatus for the collection liquefaction and storage of waste carbon dioxide gas.

A further object is to provide a liquefied carbon dioxide gas which is adapted to be stored in portable drums for future use in charging beverages.

A further object is to produce a liquefied carbon dioxide gas byproduct which retains the desirable beer aroma and which can be conveniently sold to and used by dispensers of beer and other beverages for carbonating purposes.

Other and more specific objects and advantages of the invention will be apparent as the specification is considered in connection with the accompanying drawing, in which:

The figure is a diagrammatic view of the complete apparatus.

Referring more particularly to the drawing, I denotes a fermenting vat in which the carbon dioxide gas, given off during the fermenting operation is adapted to collect in the upper portion thereof. A pipe 2 leading from the top of the fermenting vat to a cylindrical storage tank 4 has a suitable compressor 3 associated therewith, which compressor serves to draw off the carbon dioxide gas as it is formed in the vat 1, and forces it into the storage tank 4. The tank 4 has an outlet pipe 5, which pipe has a compressor 6, suitably connected therewith and motivated by the motor 7, which serves to draw off the stored carbon dioxide gas at a maximum pressure of approximately 250 pounds. A low pressure cut out 8 suitably located in the pipe 5 and set at a predetermined cut off point or pressure, controls the amount of gas withdrawn from the tank 4. A pipe 9 conducts the compressed gas from the compressor 6 to a carbon dioxide gas condenser 10, of either straight or spiral pipe construction, and cooled by ammonia or any other suitable refrigerant introduced thereto by means of the inlet pipe 12. A high pressure cut out 11, in the pipe line 9, is set at a predetermined cut off point or pressure whereby the pressure of the withdrawn gas is controlled thus preventing an excessive pressure being built up within the condenser 10. A relief valve 13 in the pipe line 9, serves to automatically conduct the excess amount of gas formed in the condenser 10 back into the suction or outlet pipe 5. An emergency relief valve 14, in the casing of the condenser, will automatically open should an excessive amount of pressure form in the condenser due to the failure of the relief valve 13 to operate or should the outlet pipe 5 become obstructed. It will thus be seen that the unit is entirely automatic in its operation and self contained.

A thermostatically controlled ammonia extension valve 15 located in the ammonia inlet pipe 12 to the condenser, is set at a temperature where it will control a predetermined condensing pressure for the carbon dioxide gas.

A magnetic switch 16, of suitable design, controls the starting and stopping of the compressor. This switch is in turn controlled by the high pressure cut out 11 and low pressure cut out 8, which instruments are connected in series with the magnetic switch 16.

Upon completion of the liquefaction of the carbon dioxide gas in the condenser 10, the liquefied gas may be stored in a suitable receiving tank, not shown, or conducted directly into carbon dioxide gas cylinders or drums 17, at a temperature of approximately 40° Fahrenheit, the lowest possible temperature at which the liquefied gas can be easily and freely forced into the drums. The cylinders are placed in a cold room, preferably the racking room of the plant, where the temperature is retained at approximately 36° F., whereby the cylinders will be chilled before being filled with the liquefied gas, thus permitting of the liquefied gas being readily forced into the cylinders at a temperature of approximately 40° F., as previously explained. This temperature results in the gas being subjected to a pressure of approximately 550 pounds, which is the lowest pressure that it can be forced easily into the cylinders. The desired beer aroma is thus retained in the gas and considerable saving in power effected.

I am aware that a considerable range in the temperature and pressure might be used in performing this operation, but this is the lowest temperature and pressure that can be employed.

While my improved gas is particularly useful in connection with the drawing of beer, I have found in actual practice that the beer aroma does not render the liquefied gas objectionable for carbonating purposes generally.

Having thus described my invention:
What I claim is:

1. In combination with a fermentation vat, a device for the collection, liquefaction and storage of carbon dioxide gas from said vat comprising a storage tank, a compressor for withdrawing carbon dioxide gas from said vat and forcing it under pressure into said tank, a condenser for said carbon dioxide gas, a second compressor for withdrawing the compressed gas from said tank and forcing it under a higher pressure to said condenser, means for supplying refrigerant to said condenser for cooling the same, an expansion valve for controlling the supply of refrigerant to said condenser responsive to condenser temperature, means for controlling the operation of the second compressor subject to pressure between the storage tank and the second compressor and subject also to pressure between the second compressor and the condenser, and a pressure relief connection between the pressure and suction connections to the second compressor.

2. A device for the collection, liquefaction and storage of carbon dioxide gas comprising a storage tank, a compressor for compressing carbon dioxide gas and forcing it under pressure into said tank, a condenser for said carbon dioxide gas, a second compressor for withdrawing the compressed gas from said tank and forcing it under a higher pressure to said condenser, means for supplying refrigerant to said condenser for cooling the same, an expansion valve for controlling the supply of refrigerant to said condenser responsive to condenser temperature, and means for controlling the operation of the second compressor subject to pressure between the storage tank and the second compressor and subject also to pressure between the second compressor and the condenser.

3. A device for the collection, liquefaction and storage of carbon dioxide gas comprising a storage tank, a compressor for compressing carbon dioxide gas and forcing it under pressure into said tank, a condenser for said carbon dioxide gas, a second compressor for withdrawing the compressed gas from said tank and forcing it under a higher pressure to said condenser, means for supplying refrigerant to said condenser for cooling the same, means for controlling the operation of the second compressor subject to pressure between the storage tank and the second compressor and subject also to pressure between the second compressor and the condenser, and a pressure relief connection between the pressure and suction connections to the suction compressor.

4. A source of carbon dioxide gas, a compressor for compressing said gas, a condenser for receiving the compressed gas, means for cooling said condenser, means for controlling the cooling of the condenser responsive to condenser conditions, means for controlling the operation of the compressor subject to conditions in the pressure and suction connections to the compressor, and a relief connection between said pressure and suction connections.

5. The method of collecting liquefying and storing carbon dioxide gas comprising collecting and compressing said gas, cooling said compressed gas, controlling said cooling responsive to condensing conditions, controlling compression in accordance with pressure and suction conditions, relieving pressures between suction and compression, chilling containers for receiving the liquid carbon dioxide, and introducing the liquid carbon dioxide into such containers.

ROY W. SMITH.